(12) United States Patent
Sonasath

(10) Patent No.: US 9,870,490 B2
(45) Date of Patent: Jan. 16, 2018

(54) APPARATUS AND METHOD FOR AN ANTITHEFT SECURE OPERATING SYSTEM MODULE

(71) Applicant: Samsung Electronics Co., Ltd., Suwon-si, Gyeonggi-do (KR)

(72) Inventor: Moiz Kaizar Sonasath, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 14/189,432

(22) Filed: Feb. 25, 2014

(65) Prior Publication Data

US 2015/0242644 A1    Aug. 27, 2015

(51) Int. Cl.
*G06F 21/88* (2013.01)
*G06F 21/57* (2013.01)
*G06F 21/51* (2013.01)

(52) U.S. Cl.
CPC ............ *G06F 21/88* (2013.01); *G06F 21/572* (2013.01); *G06F 2221/2111* (2013.01); *G06F 2221/2127* (2013.01)

(58) Field of Classification Search
None
See application file for complete search history.

(56) References Cited

U.S. PATENT DOCUMENTS

| | | | |
|---|---|---|---|
| 6,553,308 B1 * | 4/2003 | Uhlmann | B61L 29/24 340/988 |
| RE43,070 E | 1/2012 | Henrie | |
| 8,280,347 B2 * | 10/2012 | Azimi | H04B 1/40 455/26.1 |
| 8,385,883 B2 | 2/2013 | Rajan et al. | |
| 8,401,521 B2 * | 3/2013 | Bennett | H04L 63/30 455/141 |
| 8,527,013 B2 * | 9/2013 | Guba | G08G 1/20 455/41.2 |
| 9,485,655 B1 * | 11/2016 | Pirrotta | H04W 12/06 |
| 2007/0249322 A1 * | 10/2007 | Benco | G06F 21/88 455/410 |
| 2008/0034224 A1 * | 2/2008 | Ferren | G06F 21/88 713/193 |
| 2009/0075630 A1 * | 3/2009 | McLean | G06F 21/602 455/411 |
| 2009/0103124 A1 * | 4/2009 | Kimura | G06F 3/1204 358/1.15 |
| 2010/0216429 A1 * | 8/2010 | Mahajan | G06F 21/6245 455/411 |

(Continued)

FOREIGN PATENT DOCUMENTS

EP    1 898 662 A1    3/2008
WO    2010099376 A2    9/2010

*Primary Examiner* — Jason K. Gee
*Assistant Examiner* — Thanh T Le
(74) *Attorney, Agent, or Firm* — Jefferson IP Law, LLP

(57) ABSTRACT

An apparatus and method for a secure operating system module are provided. The method includes receiving an activation signal to enable a secure OS module, in response to the activation signal, securing user data and disabling user control to deactivate a communication module of the portable terminal, and transmitting acquired data related to the operation of the portable terminal via the communication module.

18 Claims, 5 Drawing Sheets

(56) References Cited

U.S. PATENT DOCUMENTS

| | | | | |
|---|---|---|---|---|
| 2011/0149078 | A1* | 6/2011 | Fan | G08B 13/19669 348/152 |
| 2012/0040640 | A1* | 2/2012 | Zhou | G01S 5/0018 455/410 |
| 2013/0326642 | A1* | 12/2013 | Hajj | G06F 21/88 726/34 |
| 2014/0187202 | A1* | 7/2014 | Buck | H04W 12/06 455/411 |
| 2014/0223185 | A1* | 8/2014 | Bender | G06F 21/42 713/176 |
| 2014/0364099 | A1* | 12/2014 | Pai | H04L 63/08 455/418 |
| 2015/0074796 | A1* | 3/2015 | Meir | G06F 21/32 726/19 |
| 2015/0242644 | A1* | 8/2015 | Sonasath | G06F 21/88 726/26 |

* cited by examiner

APPARATUS AND METHOD FOR AN ANTITHEFT SECURE OPERATING SYSTEM MODULE

TECHNICAL FIELD

The present disclosure relates to an apparatus and method for securing user data. More particularly, the present disclosure relates to an apparatus and method for an antitheft secure operating system module.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

User reliance on such mobile terminals has increased because such terminals provide convenient access to information such as an address book, personal information, and financial information. However, mobile terminals are easily stolen because of their size and the ease by which they can be reprogrammed. Even as mobile terminals include more technically challenging measures to lock access to the phone, these locks can be bypassed. After stealing the mobile terminal, thieves will disable features of the phone and subsequently erase data stored in the phone. Thieves may also use the information stored in the mobile terminal to access bank accounts, steal identities, and so forth.

Accordingly, there is a need for an apparatus and method for providing a secure operating system module in a mobile terminal.

SUMMARY

Aspects of the present disclosure are to address at least the above-mentioned problems and/or disadvantages and to provide at least the advantages described below. Accordingly, an aspect of the present disclosure is to provide an apparatus and method for a secure operating system module.

In accordance with an aspect of the present disclosure, a method for an antitheft secure operating system module is provided. The method includes receiving an activation signal to enable a secure OS module, in response to the activation signal, securing user data and disabling user control to deactivate a communication module of the portable terminal, and transmitting acquired data related to the operation of the portable terminal via the communication module.

In accordance with another aspect of the present disclosure, an apparatus for securing user data via an antitheft Operating System (OS) module in a portable terminal. The apparatus includes a display configured to display information to a user, a communication module configured to receive an activation signal to enable a secure OS module via a communication service, and a controller configured to, in response to the activation signal, secure user data and disable user control to deactivate the communication module, wherein the controller is configured to acquire data related to the operation of the portable terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
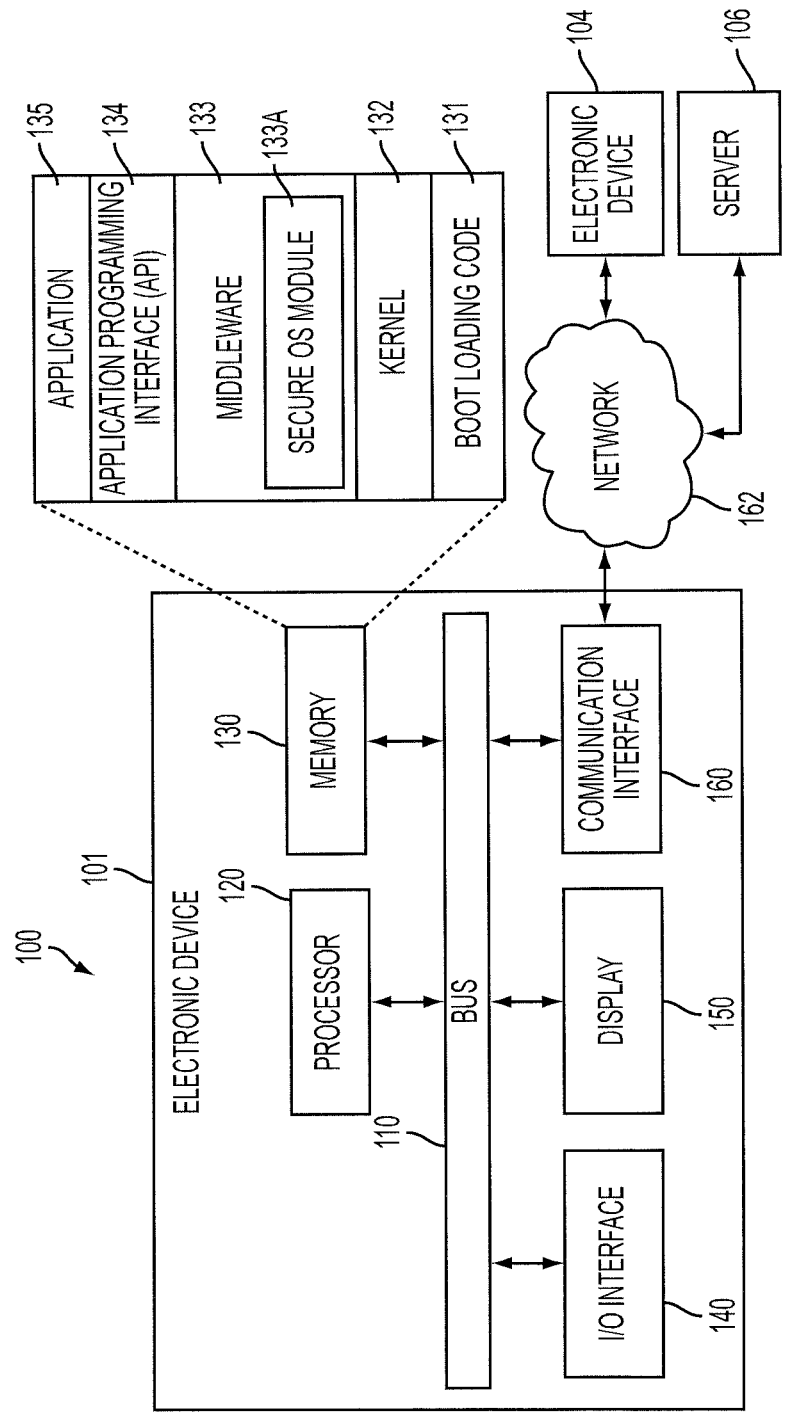
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a TeleVision (TV), a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for a secure operating system module.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, and/or the like). For example, the memory 130 may include programming modules such as a boot loading code 131, a kernel 132, a middleware 133, an Application Programming Interface (API) 134, an application 135, and/or the like. Each of the foregoing programming modules may include a combination of at least two of software, firmware, or hardware.

The boot loading code 131 provides a fixed instruction to load basic drivers of various devices that are required to load the kernel 132 of an Operating System (OS) for executing the OS. The boot loading code 131 is generally provided in a one-time programmable memory and generally provides an address (or location) of the kernel 132. In the event that the boot loading code 131 does not provide a location of the kernel 132 or the kernel 132 is defective, then the electronic device 101 is unable to load the kernel, thereby destroying the functionality of the device. This is commonly referred to as a "brick" because the device cannot be booted, thereby preventing the device from updating the firmware. For example, if an improper kernel 132 is provided and provides a different instruction set that the processor 120 cannot execute, then the kernel 132 cannot be executed and the electronic device 101 is bricked.

The kernel 132 may control or manage system resources (e.g., the bus 110, the processor 120, the memory 130, and/or the like) that may be used in executing operations or functions implemented in other programming modules such as, for example, the middleware 133, the API 134, the application 135, and/or the like. The kernel 132 may provide an interface for allowing or otherwise facilitating the middleware 133, the API 134, the application 135, and/or the like, to access individual components of electronic device 101.

The middleware 133 may be a medium through which the kernel 132 may communicate with the API 134, the application 135, and/or the like to send and receive data. The middleware 133 may control (e.g., scheduling, load balancing, and/or the like) work requests by one or more applications 135. For example, the middleware 133 may control work requests by one or more applications 135 by assigning priorities for using system resources (e.g., the bus 110, the processor 120, the memory 130, and/or the like) of electronic device 101 to the one or more applications 135.

The middleware 133 may include a secure OS module 133A for securing information and surreptitiously providing acquired information when activated via an external trigger. The external trigger is provided when a bona fide purchaser of the electronic device requests activation of the secure OS module. For example, the secure OS module 133A is configured to be activated by a signal from a hardware vendor that is associated with a hardware identifier such as an International Mobile Station Equipment Identity (IMEI)

and/or a Media Access Control (MAC) address of the electronic device 101. The secure OS module 133A, as described below, surreptitiously provides data to the hardware vendor, a third party, and/or the bona fide purchaser. Generally, the secure OS module is activated when the electronic device is stolen by a thief or potentially misplaced by the bond fide purchaser. It is noted that any data provided from the secure OS module 133A would be configured to comport with laws according to the location of the electronic device 101 and the relevant legal jurisdiction.

The secure OS module 133A is also configured to secure data of the electronic device in response to the activation signal. For example, if a signal activates the secure OS module 133A, the secure OS module may be configured to copy certain information stored in the electronic device (e.g., address book, messages, photographs, application information, etc.) to a secure location to prevent deletion of the data. In other examples, the secure OS module 133A is configured to destroy certain information stored in the electronic device 101 (e.g., passwords, financial information, credit card information, etc.) and surreptitiously modify certain stored information (e.g., passwords, financial information, address book, etc.).

The secure OS module 133A may also be configured to disable user control of the network devices and any sensors. In such an example, the secure OS module 133A may also provide an indication that a network device is deactivated or a sensor is not enabled, thereby preventing an application 135 from accessing the surreptitiously enabled network devices and sensors. Based on the foregoing, the secure OS module 133A is capable of receiving an instruction for activating the secure OS module, an instruction for deactivating the secure OS module, an instruction for entering an alarm mode, and an instruction to brick the device to render it inoperable.

In other examples, the secure OS module 133A may be wholly or partially integral to the kernel 132 and/or the API 134, depending on the configuration of the electronic device 101.

The API 134 may be an interface that may control functions that the application 135 may provide at the kernel 132, the middleware 133, and/or the like. For example, the API 134 may include at least an interface or a function (e.g., command) for file control, window control, video processing, character control, and/or the like.

According to various embodiments of the present disclosure, the application 135 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an interne browsing application, a gaming application, a media playback application, an image/video capture application, a file management application, and/or the like. In addition to or as an alternative to, the application 135 may be an application that is associated with information exchange between the electronic device 101 and an external electronic device (e.g., electronic device 104). As an example, the application 135 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the interne browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 135 may include one or more applications that are determined according to a property (e.g., type of electronic device, and/or the like) of the external electronic device (e.g., the electronic device 104). For example, if the external electronic device is an mp3 player, the application 135 may include one or more applications related to music playback. As another example, if the external electronic device is a mobile medical device, the application 135 may be a health care-related application. According to various embodiments of the present disclosure, the application 135 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 135, the API 134, the middleware 133, the kernel 132, the communication interface 160, and/or the like.

Figure 2:
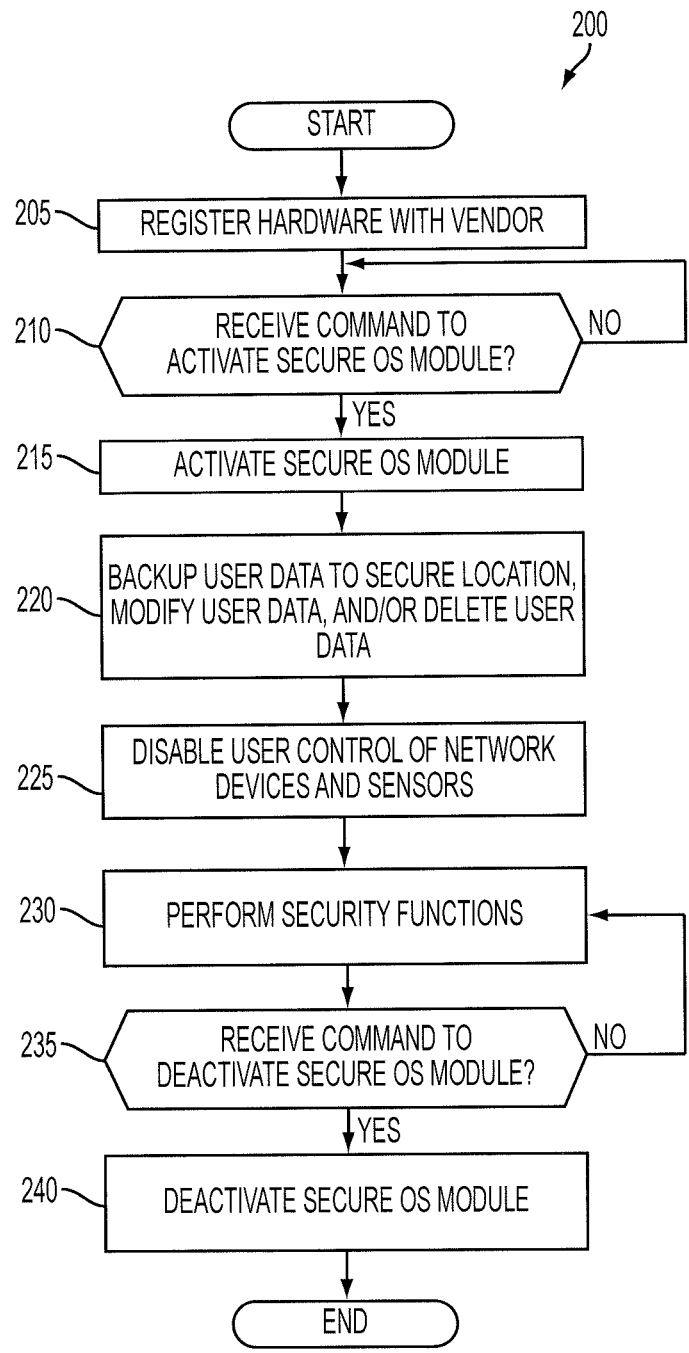
FIG. 2 illustrates a flowchart of a secure Operating System (OS) process according to various embodiments of the present disclosure.

FIG. 2 illustrates a flowchart of a secure OS process according to various embodiments of the present disclosure.

Referring to FIG. 2, an example process 200 of securing an electronic device is provided by registering a hardware Identifier (ID) with the vendor of the device. Initially, a user of the electronic device registers the hardware with the device at operation 205. Importantly, the registration process does not associate a user account such as a personal login to various services or a Subscriber Identity Module (SIM) card and, rather, uses a fixed hardware ID to register the hardware. For example, the hardware ID may be the IMEI address, a MAC address associated with a Wireless Local Area Network (WLAN) chip, or a Bluetooth® Address (BT_ADDR). The registration process can occur at the initial setup of the electronic device or can be performed later. For example, the user can register the hardware via a web portal that does not require the user to authenticate login credentials (i.e., create a personal login account). In some examples, the user may also receive a command at the electronic device to confirm registration with the vendor.

After registration of the electronic device, the electronic device performs normal operations until a command is received to activate the secure OS module at operation 210. Generally, a user activates the secure OS module if the electronic device has been stolen or misplaced. The activation procedure can be performed without associating a user login account by, for example, calling the hardware vendor, initiating an instruction from a web portal, and so forth. It is noted that some form of security would be implemented to ensure that a thief could not disable the secure OS module. If there is no command to activate the secure OS module, the electronic device continues normal operations by returning to operation 210.

If a command to activate the secure OS module is received over a network at operation 210, the secure OS module is activated at operation 215. When activated, the secure OS module copies user data of the electronic device to a secure location that cannot be accessed. Further, as noted above, the secure OS module may also delete certain information and modify certain information at operation 215. The information to be copied, modified, and deleted can be provided to the vendor during the registration at operation 205 or can be customized by the user during a later operation.

When the secure OS module is activated, the secure OS module disables user control of network devices and sensors of the electronic device 101 at operation 225. However, the secure OS module is configured such that it appears that the relevant devices have been disabled, thereby deceiving a thief into believing that the network devices and sensors are disabled. Thus, the secure OS module is configured to surreptitiously continue network connections, even in response to a command to deactivate a communication module. For example, if a thief provides a command to enter an "airplane" mode that deactivates all wireless communication services, the secure OS module prevents some or all of the wireless communication services from deactivating, while continuing to keep at least one network service operational. In one example, the secure OS module keeps only one network service operational based on a network upload capacity. For example, a WLAN module would be kept operational if connected to a nearby WLAN network. On the other hand, if the WLAN module is not connected to a WLAN network, a cellular communication service may be connected to upload information.

The secure OS module also prevents the user from disabling various sensors of the electronic device while providing an indication that the services are operational. For example, if the thief attempts to disable a Global Positioning System (GPS) receiver, the secure OS module prevents disabling of the GPS receiver, while allowing the GPS to remain active and actively log the geographical location of the electronic device. As will be described later, while the secure OS module is activated, usage data of the electronic device may be provided to any relevant party to facilitate recovery of the electronic device.

The secure OS module is configured such that a user application cannot access the network service or the sensor. For example, if a thief deactivates all wireless network services and attempts to connect to an Internet service using a web browser, the web browser will indicate that the network is not available, even though it remains activated as indicated above. In another example, if the thief activates an application that requests the electronic device's present location using GPS, the application will be denied the access to GPS services, even though the GPS sensor is presently receiving information.

After the user control devices and sensors have been disabled, the secure OS module performs the relevant security functions at operation 230, which will be described below. If the secure OS module receives a command to deactivate the secure OS module at operation 235, the secure OS module is deactivated and the process ends. When the secure OS module is deactivated, the device may remove any restrictions that were put in place during the operation of the secure OS module. For example, the user is able to again control the operation of the network devices and sensors. Further, the device may remove any data that was acquired in the secure OS mode (e.g., pictures, sensor data, etc.) and may restore the secured user data if, for example, the user data was modified. However, if there is no instruction to deactivate the secure OS module at operation 235, the secure OS module returns back to operation 230 to continue performing the relevant security functions.

Figure 3:
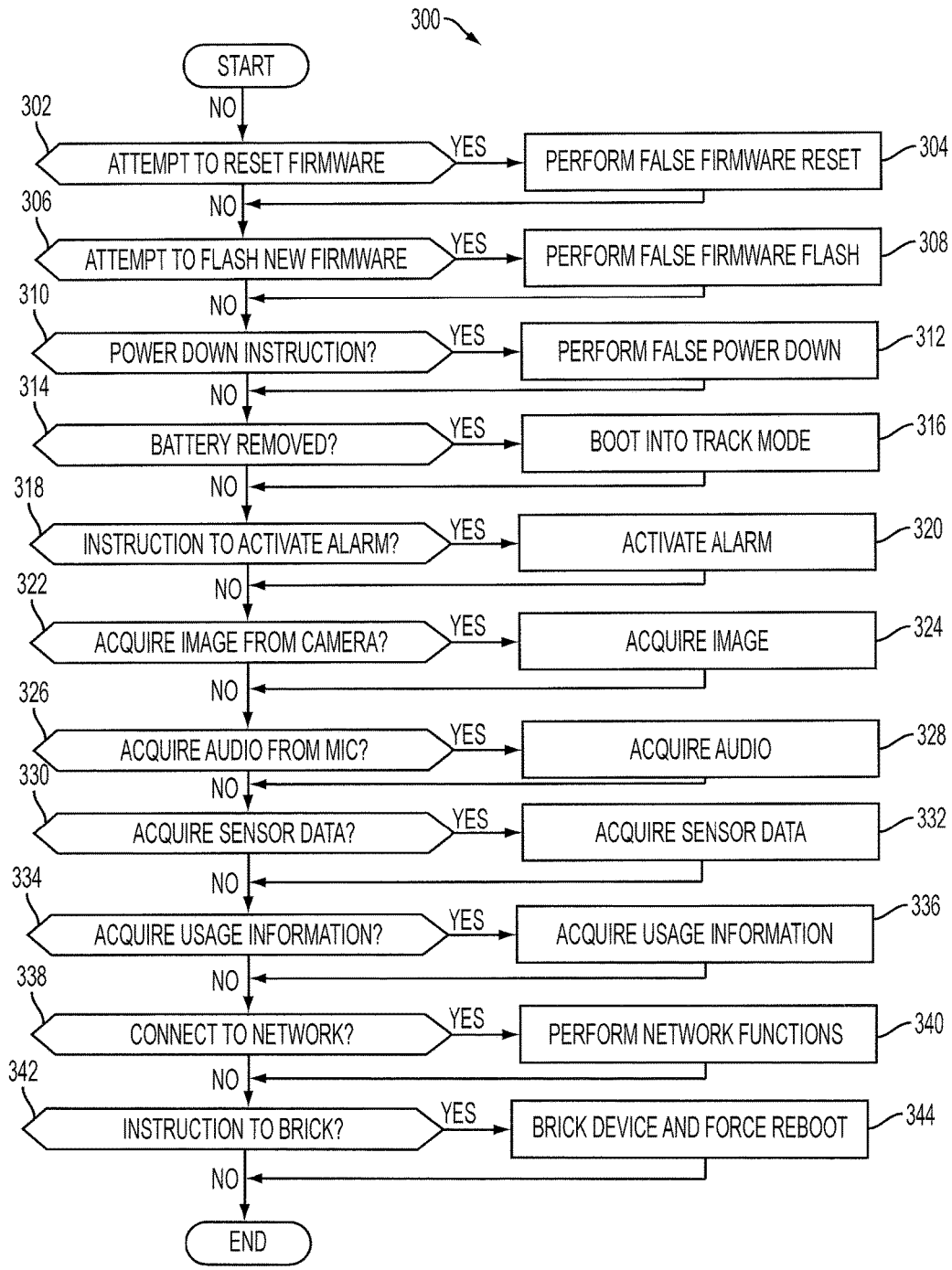
FIG. 3 illustrates a flowchart of the security functions according to various embodiments of the present disclosure.

FIG. 3 illustrates a flowchart of security functions according to various embodiments of the present disclosure.

Referring to FIG. 3, an example process 300 illustrates security functions that can be implemented in operation 230 of FIG. 2. Specifically, the example process 300 detects if there is an attempt to reset the firmware to factory default settings at operation 302. If the reset the firmware to factory default settings is detected, the process 300 is configured to perform a false firmware reset, which displays the factory default reset without actually resetting the firmware at operation 304. However, the false firmware reset may reset all data except the secured user data while continuing to keep the secure OS module activated, thereby deceiving the thief into believing that all data has been erased.

After performing the false firmware reset or if no reset firmware instruction is detected, the example process 300 detects if there is an attempt to flash a new firmware at operation 306. If the secure OS module detects an attempt to flash a new firmware, the example process 300 performs a false firmware flash, which displays a firmware flashing operation without actually updating the firmware at operation 308. In such a scenario, the secure OS module may update data according to the attempted firmware update such that it appears that the firmware has been flashed into the electronic device. In some examples, the secure OS module may be configured to connect to a server and update information associated with the attempted firmware (e.g., background screen, and so forth). This operation deceives the thief into believing that the firmware has been updated, when it has not and the secure OS module remains operational.

After the false firmware flash or if there is no attempt to flash a new firmware, the example process 300 determines if there is a power down instruction to turn off the electronic device at operation 310. If there is a power down instruction, the example process 300 performs a false power down operation, which displays a power off operation without powering down the electronic device at operation 312. If the false power off operation is performed, the electronic device acts as if powered off and continues the example process 300.

After the false power off operation or if there is no attempt to power off the electronic device, the example process 300 determines if the battery is removed at operation 314. If the battery is removed, the example process 300 boots the electronic device into a track mode using a second battery that is integral to the electronic device at operation 316. Once booted into the track mode, the example process 300 continues to operate, but in a state in which there is no display and a portion of the described functions do not necessarily occur to preserve power in the second battery.

If the battery is not detected as removed or after the electronic device is in the track mode, the secure OS module determines if there is an instruction to activate an alarm at operation 318. A user may provide an instruction, which is transmitted over any suitable network, to generate an alarm if the user believes that the electronic device has been misplaced. If the instruction to activate an alarm is received, the example process 300 activates one or more features of the device, either audio or visual, to enable the user to locate the electronic device at operation 320. For example, the electronic device may aurally present an alarm, visually provide a flash from a camera, and/or display a white screen. In some examples, the electronic device may vibrate to create an aural indication of its present location.

If there is no instruction to activate the alarm or after the alarm has been activated, the example process 300 determines if a camera of the electronic device should acquire an image at operation 322. If it is determined that the electronic device should acquire an image, the electronic device captures an image at operation 324 and stores the acquired image at a secure location that the thief cannot access. The image can be a single image or series of images that displays motion over a period of time (i.e., a movie). For example, if the thief is performing a typing operation, the example process 300 may cause the electronic device to operate a forward facing camera to capture an image of the thief's face without providing any alert.

After acquiring the image or if there no determination to capture an image, the example process 300 determines if audio should be captured at operation 326. If the example process 300 determines to capture audio, the example process 300 records audio information at operation 328 and stores the recorded audio at a location that the thief cannot access.

After acquiring the audio or if there is no determination to capture audio, the example process 300 determines if a sensor data should be captured at operation 330. If the example process 300 determines to capture sensor data, the example process 300 captures any relevant sensor information at operation 332. For example, if the example process 300 determines that the electronic device is in motion, the secure OS module activates a GPS module and records the GPS information and stores the GPS locations at operation 332. Other sensors include biometric sensors such as a finger print scanner, a retina scanner, and so forth. For example, while using an electronic device equipped with a finger print scanner, the finger print scanner may capture the finger print of the operator.

After acquiring the sensor data or if there is no determination to capture sensor data, the example process 300 determines if usage information should be acquired at operation 334. Usage information generally entails any relevant data of the electronic device's use such as, for example, web browsing, email messaging, text messaging, voice phone calls, photographs, movies, and so forth. If the usage information should be acquired, the example process 300 acquires the usage information at operation 336 and stores the information in a secure location that the thief cannot access.

After acquiring the usage information or if there is no determination to capture usage information, the example process 300 determines if there are any network services that the electronic device can transmit information at operation 338. If there is a network service available, the example process 300 connects to the available network at operation 340. Preferably, the example process 300 connects to the network with the greatest upload bandwidth for uploading of data gathered in the secure OS mode. At operation 340, the example process 300 performs any relevant network services in the secure OS mode.

After performing any relevant network services or if there is no available network, the secure OS module determines if there is an instruction to brick the electronic device and force a reboot at operation 342. If there is an instruction to brick the electronic device, the electronic device is bricked by altering the boot process such that a boot process can be performed. For example, the boot loading code can be altered to not point to the OS kernel, thereby rendering the electronic device unusable. In another example, the kernel could be damaged by altering a portion of the kernel that is stored in memory for the boot process. For example, a relevant portion of the kernel such as a driver to read a memory could be moved, deleted, or altered. The instruction to brick the electronic device may be provided in any suitable manner such as an express instruction that is received via a network communication or may be provided after the secure OS module has been operating for a preset period (e.g., 3 days). In another example, the instruction to brick may be provided upon completion of uploading the secured user data. After damaging the boot process as described above, the electronic device is forced to reboot at operation 344, thereby rendering the electronic device unusable and completing the brick operation.

After bricking the electronic device or if there is no instruction to brick, the example process 300 ends. As indicated in FIG. 2, the example process 300 continues until the secure OS module is deactivated or until the electronic device is bricked as described above in connection with FIG. 3.

Figure 4:
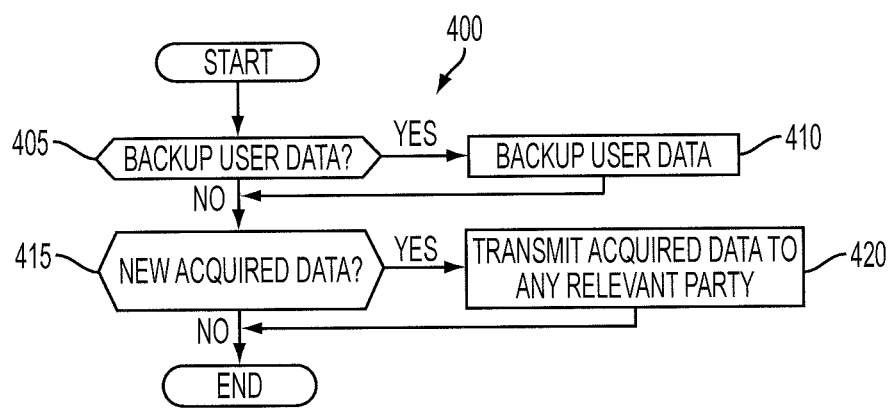
FIG. 4 illustrates a flowchart of the network functions according to various embodiments of the present disclosure.

FIG. 4 illustrates a flowchart of network functions according to various embodiments of the present disclosure.

Referring to FIG. 4, an example process 400 illustrates network functions that can be implemented at operation 338 of FIG. 3. Specifically, the example process 400 surreptitiously transmits data from the electronic device to any relevant party such as the vendor of the electronic device, local authorities, the bona fide purchaser, and so forth. As noted above, any data transmitted would comport with relevant legal requirements based on the jurisdiction. For instance, the electronic device vendor may receive the user's backup data and the local authorities may receive data such as pictures of the thief, data captured from the thief, and so forth. In some examples, the bona fide purchaser may receive the backup user data.

Initially, the example process 400 determines if there is user data that should be backed up at operation 405. If there is user data to backup, the user data is backed up at operation 410 by transmitting the relevant data over the network connection as described above in example process 300. Specifically, the example process 400 backs up the initially secured data and may also backup data that was not initially secured such as photos, videos, messages, and so forth.

After the user data is backed up or if there is no user data to backup, the example process 400 determines if there is recently acquired data (i.e., data acquired above in connection with FIG. 3) that should be transmitted to any relevant party at operation 415. If there is any acquired data, the acquired data is transmitted to any relevant party at operation 420. As noted above in connection with FIG. 3, a secure OS module that implements process 300 captures images, audio, sensor data, and usage data such as web browsing information, numbers input to initiate contact, email addresses used to compose emails, and so forth. The example process 400 may upload any newly acquired data without the thief's knowledge, thereby providing the bona fide purchaser or law enforcement information to facilitate recovery of the electronic device.

In other examples, the secure OS module may transmit all relevant information to the hardware vendor. The hardware vendor may store the information and may selectively allow the bona fide purchaser to review a portion of the acquired data. In many cases, because the thief may be loosely associated with the bona fide purchaser, the identity of the thief may be revealed by a simple review of the acquired information.

Figure 5:
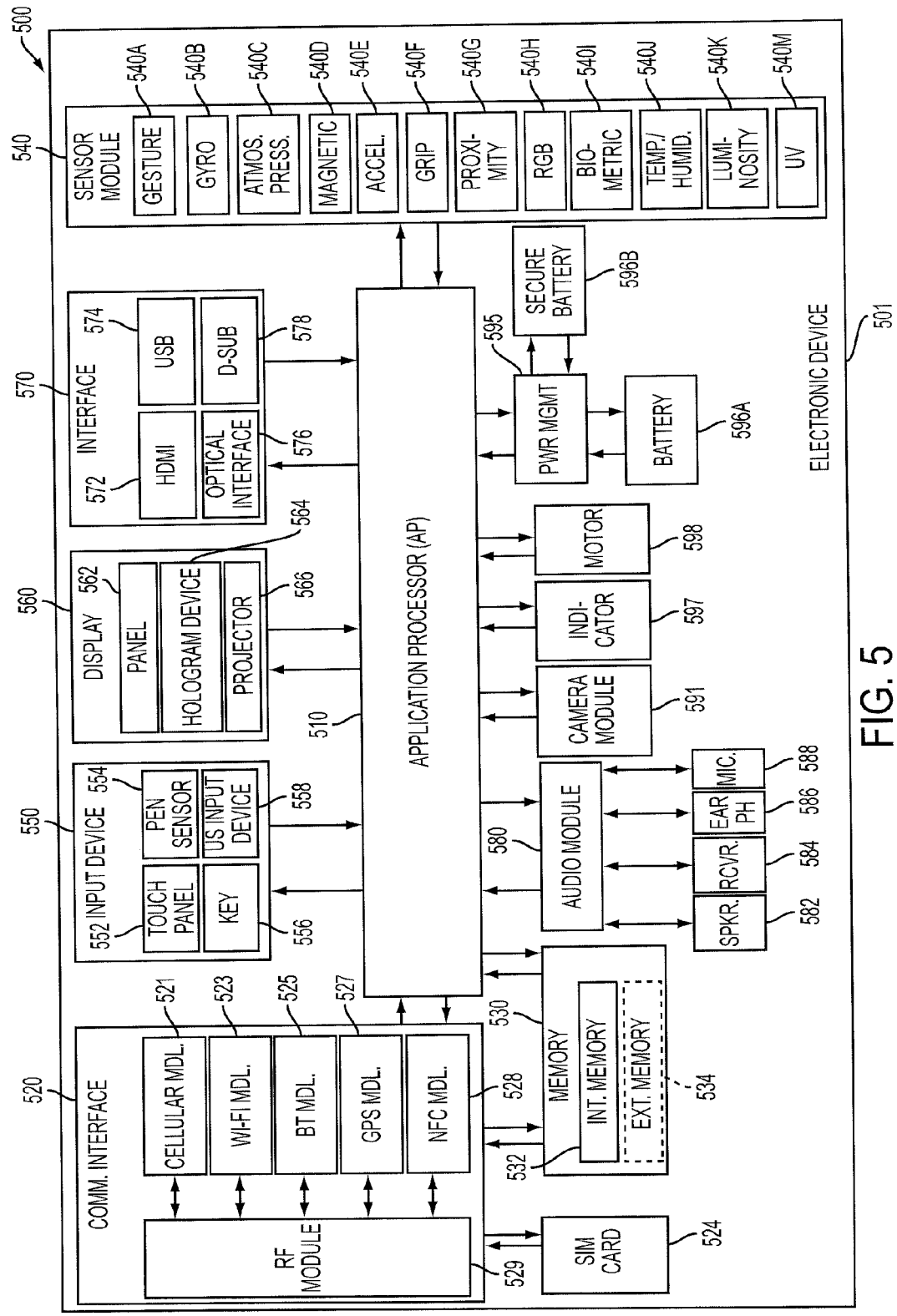
FIG. 5 illustrates a block diagram of hardware according to various embodiments of the present disclosure.

FIG. 5 illustrates a block diagram of hardware according to various embodiments of the present disclosure.

Referring to FIG. 5, hardware 501 may be, for example, all or a part of the electronic device 101. Referring to FIG. 5, the hardware 501 may include one or more Application Processors (AP) 510, a communication module 520, a SIM card 524, a memory 530, a sensor module 540, an input module 550, a display module 560, an interface 570, an audio module 580, a camera module 591, a power management module 595, a battery 596A, a secure battery 596B, an indicator 597, a motor 598, and/or the like.

The AP 510 may control one or more hardware or software components that are connected to AP 510, perform processing or computation of data (including multimedia data), and/or the like. As an example, the AP 510 may be implemented as a System-on-Chip (SoC). The AP 510 may include a Graphics Processing Unit (GPU) (not shown).

The communication module 520 (e.g., the communication interface 160) may transmit and receive data in communications between the electronic device 101 and other electronic devices (e.g., the electronic device 104, the server 106, and/or the like). As an example, the communication module 520 may include one or more of a cellular module 521, a Wi-Fi module 523, a Bluetooth module 525, a GPS module 527, a NFC module 528, a Radio Frequency (RF) module 529, and/or the like.

The cellular module 521 may provide services such as, for example, a voice call, a video call, a Short Messaging Service (SMS), interne service, and/or the like, via a communication network (e.g., LTE, LTE-A, CDMA, WCDMA, UMTS, WiBro, GSM, and/or the like). As an example, the cellular module 521 may differentiate and authorize electronic devices within a communication network using a Subscriber Identification Module (SIM) card (e.g., the SIM card 524). According to various embodiments of the present disclosure, the cellular module 521 may perform at least a part of the functionalities of the AP 510. For example, the cellular module 521 may perform at least a part of multimedia control functionality.

According to various embodiments of the present disclosure, the communication interface 520 and/or the cellular module 521 may include a Communication Processor (CP). As an example, the cellular module 521 may be implemented as SoC.

Although FIG. 5 illustrates components such as the cellular module 521 (e.g., CP), the memory 530, the power management module 595 as components that are separate from the AP 510, according to various embodiments of the present disclosure, the AP 510 may include, or be integrated with, one or more of the foregoing components (e.g., the cellular module 521).

According to various embodiments of the present disclosure, the AP 510, the cellular module 521 (e.g., CP), and/or the like, may process instructions or data received from at least one of non-volatile memory or other components by loading in volatile memory. The AP 510, the cellular module 521, the communication interface 520, and/or the like, may store at non-volatile memory at least one of data that is received from at least one of other components or data that is generated by at least one of the other components.

Each of the Wi-Fi module 523, the Bluetooth module 525, the GPS module 527, the NFC module 528, and/or the like may, for example, include one or more processors that may process data received or transmitted by the respective modules. Although FIG. 5 illustrates the cellular module 521, the Wi-Fi module 523, the Bluetooth module 525, the GPS module 527, and the NFC module 528 as separate blocks, according to various embodiments of the present disclosure, any combination (e.g., two or more) of the cellular module 521, the Wi-Fi module 523, the Bluetooth module 525, the GPS module 527, the NFC module 528, and/or the like may be included in an Integrated Chip (IC) or an IC package. For example, at least some of the processors corresponding to the respective the cellular module 521, the Wi-Fi module 523, the Bluetooth module 525, the GPS module 527, the NFC module 528, and/or the like, may be implemented as a single SoC. For example, a CP corresponding to the cellular module 521 and a Wi-Fi processor corresponding to Wi-Fi module 523 may be implemented as a single SoC.

The RF module 529 may, for example, transmit and receive RF signals. Although not shown, the RF module 529 may include a transceiver, a Power Amp Module (PAM), a frequency filter, a Low Noise Amplifier (LNA), and/or the like. The RF module 534 may include one or more components for transmitting and receiving Electro-Magnetic (EM) waves (e.g., in free space or the like) such as, for example, conductors or conductive wires. Although FIG. 5 illustrates that the cellular module 521, the Wi-Fi module 523, the Bluetooth module 525, the GPS module 527, and the NFC module 528 are sharing one RF module 529, according to various embodiments of the present disclosure, at least one of the cellular module 521, the Wi-Fi module 523, the Bluetooth module 525, the GPS module 527, the NFC module 528, and/or the like may transmit and receive RF signals via a separate RF module.

The SIM card 524 may be a card implementing a SIM, and may be configured to be inserted into a slot disposed at a specified location of the electronic device. The SIM card 524 may include a unique identifier (e.g., Integrated Circuit Card IDentifier (ICCID)) subscriber information (e.g., International Mobile Subscriber Identity (IMSI)), and/or the like.

The memory 530 (e.g., memory 130) may include an internal memory 532, an external memory 534, or a combination thereof.

According to various embodiments of the present disclosure, the internal memory 532 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 532 may be a Solid State Drive (SSD). As an example, the external memory 534 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 534 may be operatively coupled to electronic device 501 via various interfaces. According to various embodiments of the present disclosure, the electronic device 501 may include recording devices (or recording media) such as, for example, Hard Disk Drives (HDD), and/or the like.

The sensor module 540 may measure physical/environmental properties detect operational states associated with electronic device 501, and/or the like, and convert the measured and/or detected information into signals such as, for example, electric signals or electromagnetic signals. As an example, the sensor module 540 may include at least one of a gesture sensor 540A, a gyro sensor 540B, an atmospheric pressure sensor 540C, a magnetic sensor 540D, an accelerometer 540E, a grip sensor 540F, a proximity sensor 540G, an RGB sensor 540H, a biometric sensor 540I, a temperature/humidity sensor 540J, a luminosity sensor 540K, a Ultra Violet (UV) sensor 540M, and/or the like. The sensor module 540 may detect the operation state of the electronic device and/or measure physical properties, and convert the detected or measured information into electrical signals. Additionally or alternatively, the sensor module 540 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 540 may also include control circuitry for controlling one or more sensors included therein.

The input module 550 may include a touch panel 552, a (digital) pen sensor 554, a key 556, an ultrasonic input device 558, and/or the like.

As an example, the touch panel 552 may detect touch input using capacitive, resistive, infrared, ultrasonic methods, and/or the like. The touch panel 552 may also include a touch panel controller (not shown). As an example, a capacitive-type touch panel may detect proximity inputs (e.g. hovering input) in addition to, or as an alternative to, physical touch inputs. The touch panel 552 may also include a tactile layer. According to various embodiments of the present disclosure, the touch panel 552 may provide haptic feedback to the user using the tactile layer.

As an example, the (digital) pen sensor 554 may be implemented using methods identical to or similar to receiving a touch input from a user, or using a separate detection sheet (e.g., a digitizer).

As an example, the key 556 may be a keypad, a touch key, and/or the like.

As an example, the ultrasonic input device 558 may be a device configured to identify data by detecting, using a microphone (e.g., microphone 588), ultrasonic signals generated by a device capable of generating the ultrasonic signal. The ultrasonic input device 558 may detect data wirelessly.

According to various embodiments of the present disclosure, the electronic device 501 may receive user input from an external device (e.g., a network, computer or server) connected to the electronic device 501 using the communication module 520.

The display module 560 (e.g., display 150) may include a panel 562, a hologram device 564, a projector 566, and/or the like. As an example, the panel 562 may be, for example, a Liquid-Crystal Display (LCD), an Active-Matrix Organic Light-Emitting Diode (AM-OLED) display, and/or the like. As an example, the panel 562 may be configured to be flexible, transparent, and/or wearable. The panel 562 and the touch panel 552 may be implemented as a single module. The hologram device 564 may provide a three-dimensional image. For example, the hologram device 564 may utilize the interference of light waves to provide a three-dimensional image in empty space. The projector 566 may provide image by projecting light on a surface (e.g., a wall, a screen, and/or the like). As an example, the surface may be positioned internal or external to electronic device 501. According to various embodiments of the present disclosure, the display module 560 may also include a control circuitry for controlling the panel 562, the hologram device 564, the projector 566, and/or the like.

The interface 570 may include, for example, one or more interfaces for a High-Definition Multimedia Interface (HDMI) 572, a Universal Serial Bus (USB) 574, a projector 576, or a D-subminiature (D-sub) 578, and/or the like. As an example, the interface 570 may be part of the communication interface 520. Additionally or alternatively, the interface 570 may include, for example, one or more interfaces for Mobile High-definition Link (MHL), Secure Digital (SD)/MultiMedia Card (MMC), Infrared Data Association (IrDA), and/or the like.

The audio module 580 may encode/decode sound into electrical signal, and vice versa. According to various embodiments of the present disclosure, at least a portion of audio module 580 may be part of the I/O interface 140. As an example, the audio module 580 may encode/decode voice information that is input into, or output from, the speaker 582, the receiver 584, the earphone 586, the microphone 588, and/or the like.

The camera module 591 may capture still images and/or video. According to various embodiments of the present disclosure, the camera module 591 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 595 may manage electrical power of the electronic device 501. Although not shown, the power management module 595 may include, for example, a Power Management Integrated Circuit (PMIC), a charger Integrated Circuit (charger IC), a battery gauge, a fuel gauge, and/or the like.

As an example, the PMIC may be disposed in an integrated circuit or a SoC semiconductor. The charging method for the electronic device 501 may include wired or wireless charging. The charger IC may charge a battery, may prevent excessive voltage or excessive current from a charger from entering the electronic device 501, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 596A, and/or the like.

As an example, the battery 596A may supply power to the electronic device 501. As an example, the battery 596A may be a rechargeable battery, a solar battery, and/or the like. A secure battery 596B may be provided to power the electronic device 501 in the track mode, which performs a part of the described processes in connection with FIGS. 2-4.

The indicator 597 may indicate one or more states (e.g., boot status, message status, charge status, and/or the like) of the electronic device 501 or a portion thereof (e.g., AP 510). Motor 598 may convert an electrical signal into a mechanical vibration.

Although not shown, the electronic device 501 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for securing user data via an antitheft Operating System (OS) module in a portable terminal, the method comprising:
    receiving an activation signal to enable a secure OS module;
    in response to the activation signal, securing user data and disabling a user control associated with a transceiver of the portable terminal, wherein the user control comprises a graphical element configured to generate a command to enable or disable the transceiver based on the secure OS module;
    while the user control is disabled, transmitting acquired data related to the operation of the portable terminal via the transceiver;
    while the user control is disabled and when a user command to deactivate the transceiver is input via the graphical element, displaying a false indication that the transceiver is deactivated via the graphical element; and
    in response to an event associated with a primary battery while the secure OS module is enabled, booting into a tracking mode using a secondary battery of the portable terminal,
    wherein, when the user control is disabled, the transceiver is enabled and the user control is inhibited from generating the command to enable or disable the transceiver
    wherein a function of the secure OS module is disabled during the tracking mode.

2. The method of claim 1, wherein, if a user application being executed on the portable terminal requests to send or receive data, providing an indication that the transceiver is deactivated to the user application.

3. The method of claim 2, further comprising, in response to the activation signal, disabling user control to deactivate a sensor of the portable terminal.

4. The method of claim 3, further comprising, in response to receiving a user command to deactivate the sensor, displaying an indication that the sensor is deactivated, wherein the sensor remains enabled in response to the user command.

5. The method of claim 4, wherein, if a user application being executed on the portable terminal requests to send data from the sensor, providing an indication that the sensor is deactivated to the user application.

6. The method of claim 2, further comprising, in response to a command to power down the portable terminal, displaying a power down operation, wherein the portable terminal continues the transmitting of the acquired data after the displaying of the power down operation.

7. The method of claim 2, further comprising, in response to a command to update a firmware of the portable terminal, displaying a flashing operation of the firmware, wherein the portable terminal is not updated with the firmware.

8. The method of claim 2, wherein the acquired data comprises at least one of a captured image, a captured moving image, audio from a microphone, sensor data from a sensor, and usage information.

9. The method of claim 2, wherein the event comprises detecting removal of the primary battery.

10. An apparatus for securing user data via an antitheft Operating System (OS) module in a portable terminal, the apparatus comprising:
 a display;
 a transceiver; and
 at least one processor configured to:
  receive an activation signal to enable a secure OS module,
  in response to the activation signal, secure user data and disable a user control to associated with the transceiver, wherein the user control comprises a graphical element configured to generate a command to enable or disable the transceiver based on the secure OS module,
  while the user control is disabled, control the transceiver to transmit acquired data related to the operation of the portable terminal,
  while the user control is disabled and when a user command to deactivate the transceiver is input via the graphical element, control the display to output a false indication that the transceiver is deactivated via the graphical element, and acquire data related to the operation of the portable terminal, and in response to an event associated with a primary battery while the secure OS module is enabled, boot into a tracking mode using a secondary battery of the portable terminal,
 wherein, when the user control is disabled, the transceiver is enabled and the user control is inhibited from generating the command to enable or disable the transceiver
 wherein a function of the secure OS module is disabled during the tracking mode.

11. The apparatus of claim 10, wherein the at least one processor is further configured to provide an indication that the transceiver is deactivated to a user application being executed.

12. The apparatus of claim 11, wherein in response to the activation signal, the at least one processor further is configured to disable user control to deactivate a sensor of the portable terminal.

13. The apparatus of claim 11, wherein, in response to receiving a user command to deactivate a sensor, the at least one processor is further configured to enable the display to display an indication that the sensor is deactivated, wherein the sensor remains enabled in response to the user command.

14. The apparatus of claim 12, wherein the at least one processor is further to provide an indication that the sensor is deactivated to a user application being executed.

15. The apparatus of claim 11,
 wherein, in response to a command to power down the device, the at least one processor is further configured to enable the display to display a power down operation, and
 wherein the apparatus continues the transmitting of the acquired data after the displaying of the power down operation.

16. The apparatus of claim 11,
 wherein, in response to a command to update a firmware of the apparatus, the at least one processor is further configured to enable the display to display a flashing operation of the firmware, and
 wherein the apparatus is not updated with the firmware.

17. The apparatus of claim 11, wherein the acquired data comprises at least one of a captured image, a captured moving image, audio from a microphone, sensor data from a sensor, and usage information.

18. The apparatus of claim 11,
 wherein the event comprises removal of the primary battery.

* * * * *